United States Patent [19]

Löhr et al.

[11] Patent Number: 4,993,693
[45] Date of Patent: Feb. 19, 1991

[54] SELF-PUMPING HYDROPNEUMATIC SHOCK ABSORBING LEG WITH INTERNAL LEVEL REGULATION

[75] Inventors: Karl-Heinz Löhr; Ewald Kohberg, both of Eitorf; Norbert Sommer, Königswinter; Hubert Beck, Eitorf, all of Fed. Rep. of Germany

[73] Assignee: Boge AG, Eitorf, Fed. Rep. of Germany

[21] Appl. No.: 349,004

[22] Filed: May 9, 1989

[30] Foreign Application Priority Data

May 11, 1988 [DE] Fed. Rep. of Germany ....... 3816102

[51] Int. Cl.⁵ .................... B60G 17/00; F16F 9/34
[52] U.S. Cl. ............................ 267/64.17; 188/322.14
[58] Field of Search .................. 267/64.16, 64.17; 188/299, 282, 313–315, 318, 322.14; 280/708, 714

[56] References Cited

U.S. PATENT DOCUMENTS

| 3,148,871 | 9/1964 | Wilkens et al. | 267/64.17 |
| 3,536,312 | 10/1970 | Lohr | 188/282 X |
| 4,445,673 | 5/1984 | Clark | 188/282 Y |
| 4,577,840 | 3/1986 | Meller et al. | 267/64.17 |
| 4,650,042 | 3/1987 | Kencht et al. | 188/299 |
| 4,700,812 | 10/1987 | Moser | 188/1.11 |
| 4,723,640 | 2/1988 | Beck | 188/319 |
| 4,749,069 | 6/1988 | Knecht et al. | 188/299 |
| 4,749,070 | 6/1988 | Moser et al. | 188/299 |
| 4,785,920 | 11/1988 | Knecht et al. | 188/299 |
| 4,800,995 | 1/1989 | Bernhardt et al. | 188/319 |

FOREIGN PATENT DOCUMENTS

| 2356802 | 10/1975 | Fed. Rep. of Germany. |
| 2944831 | 5/1980 | Fed. Rep. of Germany. |
| 1362164 | 4/1964 | France | 188/318 |

Primary Examiner—Robert J. Oberleitner
Attorney, Agent, or Firm—Nils H. Ljungman & Associates

[57] ABSTRACT

Self-pumping hydropneumatic shock absorbing leg with internal level regulation, in which the dampening force can be controlled and continuously adjusted during operation of a vehicle. For this purpose, the work piston of the shock absorber is provided with a check valve, whereby a passage runs from one work chamber to an adjustable dampening valve, and from this damping valve, a flow connection runs directly or indirectly via at least one additional check valve into the other work chamber and into a circulation passage which forms a connection to the high pressure chamber.

19 Claims, 1 Drawing Sheet

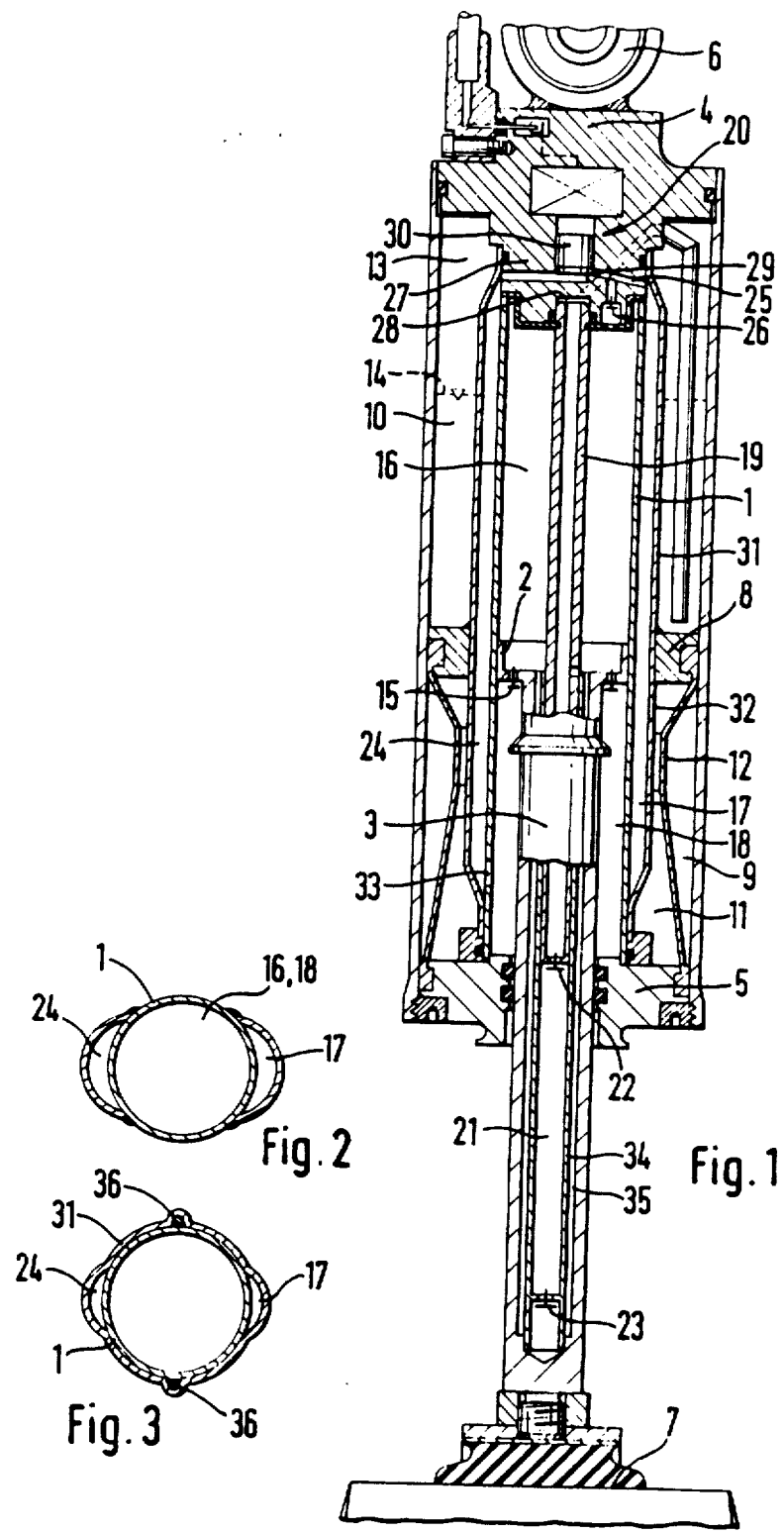

SELF-PUMPING HYDROPNEUMATIC SHOCK ABSORBING LEG WITH INTERNAL LEVEL REGULATION

BACKGROUND OF THE INVENTION

1. Field of the Invention

This invention relates generally to shock absorbers and, more particularly, to a self-pumping hydropneumatic shock absorbing leg or strut with internal level control or regulation for use in motor vehicles. Exemplary of such apparatuses is one having a work cylinder filled with a dampening medium: e.g., oil, under the pressure of at least one gas cushion, such as nitrogen, located in a high pressure chamber which acts as a spring. The work cylinder is divided into two work chambers by a piston supported or carried by a hollow piston rod, which is driven by the movements of the spring and which transports dampening medium from a low pressure chamber into the work chamber connected to the high pressure chamber. The pump cylinder of the piston pump is formed by the hollow piston rod, into which extends a hollow pump rod attached or fastened to the work cylinder and having valve means (e.g., a suction valve) on its forward end. The hole in the pump rod is connected to the low pressure chamber, and with a deregulation opening which can be closed as a function of the position of the work piston in the work cylinder, wherein the deregulation opening connects the work chamber connected with the high pressure chamber with a deregulation passage having a throttle, and emptying into the low pressure chamber.

2. Description of the Prior Art

The prior art includes such shock absorbing legs (German Laid Open Patent Appln. No. 29 44 831, German Patent Publication Published for Opposition Purposes No. 23 56 802), in which the work cylinder is divided into two work chambers by a work piston supported by a piston rod, and in which the work piston is equipped with valves to produce a dampening force. There is a corresponding valve for each direction of movement of the work piston. These valves are used to produce a certain specified dampening force depending on the piston velocity range.

OBJECT OF THE INVENTION

A principal object of this invention is to provide a shock absorber; e.g., a self-pumping hydropneumatic shock absorbing leg, in which the damping force is controlled by continuous self-adjustment during operation of the vehicle to which it is affixed.

SUMMARY OF THE INVENTION

Such an object is attained by providing a shock absorber having a piston in a work cylinder containing dampening medium and a compensation chamber partly filled with dampening medium and partly filled with gas, and acting as a spring, with two conduits which are advantageously located in the compensation chamber. One conduit and the working cylinder communicate with each other and permit the movement of dampening medium from one to the other through passage means, such as a hole or throttle. The second conduit and the compensation chamber have passage means as well between them. The two conduits are in a communicating relationship with each other and with the working cylinder by means of a flow connection. The flow connection leading into the working cylinder can be and advantageously is provided with valve means to better control the flow. Moreover, an adjustable valve may be so employed to permit discriminatory flow of dampening medium from one conduit to the second conduit or to the working cylinder depending on the piston position.

The foregoing object is achieved in accordance with the invention in that the work piston can carry a flow of dampening medium in one direction by means of at least one check valve, whereby a passage runs from a work chamber to valve means: e.g., an adjustable dampening valve, having a flow connection running directly or indirectly by way of a check valve into the other work chamber and/or into a circulation passage which forms a connection with the high pressure chamber.

It is advantageous in this configuration that the damping medium, regardless of the direction of movement of the work piston, flows constantly in one direction, whereby the dampening medium always travels from one work chamber, via a passage, past the adjustable damping valve directly into the high pressure chamber or, if the piston rod is extended, and under the appropriate pressure conditions, into the other work chamber. Since the hollow piston rod is connected via a hole with the low pressure chamber in such a configuration, it is possible to achieve both an internal level regulation of the system, as well as a controllable, continuously adjustable regulation of the dampening force. By using integrated or even external sensors, an automatic and independent dampening of forces regulation may be achieved on a shock absorbing leg with internal level regulation as is known in the art: e.g., U.S. Pat. No. 4,650,042, which is hereby incorporated by reference as if the entire contents thereof were fully set forth herein, as are U.S. Pat. Nos. 4,650,042; 4,700,812; 4,723,640; 4,749,069; 4,785,920. These patents disclose specific structures relating to adjustable shock absorbers including dampening valves and electromagnetic control valves for the operation thereof.

In accordance with another important characteristic, the base of the dampening valve body holds the pump rod in a rigid and sealed manner in a hole. In this embodiment, the adjustable damping valve is located in the vicinity of the end of the shock absorbing leg and the hollow pump rod is seated in the base body and connects the hollow pump rod with the low pressure chamber of the shock absorber.

In another embodiment of the invention, an additional check valve is located in the base of the dampening valve.

From the standpoint of ease of fabrication, it is advantageous that the conduit and/or the circulation passage be located outside the work cylinder. Thus, passages or conduits can thereby be advantageously formed by a tube which is concentric with the work cylinder and, which by means of partitions separates the conduits from one another and from the low pressure and high pressure chamber respectively.

In this embodiment, it is advantageous to use a pipe or tube which, at least partly, has an inside diameter substantially the same as the outside diameter of the work cylinder so that, by using an additional gasket, for example, a separation and sealing of the individual passages is achieved. Moreover, the conduits can also be produced by a tubular piece which has been halved longitudinally and connected in a rigid and sealed manner with the work cylinder by means of appropriate joining technology, e.g. soldering, welding, etc.

In accordance with still another embodiment, the low pressure chamber and/or the high pressure chamber are located outside the shock absorbing leg as separate components.

One aspect of the invention resides broadly in a self-pumping hydropneumatic shock absorber with internal levelling control, particularly for motor vehicle, comprising a housing having means for fastening the housing to a vehicle and having a centrally disposed opening into which is fitted a slidable pumping means having an outer member. One end of the member is provided with means for fastening to another part of the vehicle and the other end to a piston rod carrying a piston located in a work cylinder containing a liquid dampening medium. A hollow pump rod is longitudinally and centrally disposed in the work cylinder and seated at one end in the base of the housing and telescopically communicates with a tubular control member. A compensation chamber is partly filled with damping medium and partly with gas. A conduit is located in the compensation chamber and passage means are provided between the conduit and the working cylinder. A second conduit is located in the compensation chamber and there is passage means between that conduit and the compensation chamber. A flow connection resides between the two conduits and between the working cylinder and the conduits.

A further aspect of the invention resides broadly in a shock absorber comprising a working cylinder; a piston disposed therein: a compensation chamber partly filled with dampening medium and partly with gas: two conduits located in the compensation chamber; and a dampening medium flow connection between the two conduits.

BRIEF DESCRIPTION OF THE DRAWINGS

Advantageous embodiments of the invention are explained in greater detail below with reference to the accompanying drawings.

FIG. 1 shows a vertical cross-section of a self-pumping hydropneumatic shock absorbing leg with internal road leveling control and an adjustable dampening valve.

FIGS. 2 and 3 depict a cross-section of the work cylinder together with a conduit and a second conduit for dampening medium circulation.

DESCRIPTION OF THE PREFERRED EMBODIMENTS

The level regulation apparatus (shock absorber) for motor vehicles depicted in FIG. 1 comprises the work cylinder 1 in which a piston 2 slides on the end of a hollow piston rod 3. The work cylinder 1 is closed on one end by a member 4 and on the other end by another member 5, through which the piston rod 3 exits in a sealed manner. In a manner not shown, the bottom member 4 is fastened or affixed by means of a fastener 6 on the body of the vehicle and the piston rod 3 is fastened by means of a fastener 7 on another portion of the vehicle: e.g., on the axle of the vehicle. The work cylinder 1 is surrounded by a ring-shaped or annular compensation chamber filled partly with oil and partly with gas. It is divided by a partition 8 into a high pressure chamber 9, 11 and a low pressure chamber 10. The high pressure chamber 9, 11 is divided by a diaphragm 12 into a damping medium chamber and a gas chamber, respectively.

In the low pressure chamber 10, the damping medium and the low pressure gas cushion 13 are in surface contact. The surface 14 between the damping medium and the gas cushion is indicated by a dashed line. When not pumped up, the same pressure prevails in the low pressure chamber 10 and in the high pressure chamber 9, 11.

The dampening medium in the high pressure chamber 9, 11 is connected via the hole 32 and the circulation passage 17 leading into the flow connection 25 and the check valve 26 and into the work chamber 16. From the work chamber 16, the damping medium flows only in one direction via the check valves 15 in the work piston 2 into the work chamber 18. The flow travels from the work chamber 18 through the hole 33 and into the passage 24 and then to the adjustable valve 20, the valve body 30 of which is sealed against the valve seat 29. If the flow connection 25 is open, the dampening medium flows either via the passage 17 to the high pressure chamber 9, 11 or if the piston 2 is extended, the dampening medium flows through the check valve 26 into the work chamber 16. Depending on the activation of the adjustable valve, a softer or harder damping force is achievable.

For level control, in a hole 28 in the base body 27, a pump rod 19 is held in a rigid and sealed manner which forms an oil pump together with a control tube 34 located in the cavity of the piston rod 3 and acting as a pump cylinder 21. The movements of the vehicle vis a vis the road surface and of the piston rod 3 fastened to it, caused by uneven spots, activate the oil pump, which constantly transports oil, controlled by the suction valve 22 from the low pressure chamber 10 via the pressure valve 23 through a hole into the intermediate chamber or annulus 35 and then into the work cylinder 1. The work piston 2 and the piston rod 3 with the control tube 34 are thereby pushed until a deregulation opening in the pump rod 19 makes a connection between the work chamber 16 under high pressure and via the hollow pump rod 19 with the low pressure chamber 10. The deregulation function is thereby initiated.

The passage or conduit 24 and the circulation passage 17 are located so that they run outside the work cylinder 1 in the low pressure chamber 10 and the high pressure chamber 9, 11 respectively. FIG. 2 is a cross section of the work cylinder 1, wherein the passage 24 and the circulation passage 17 are rigidly connected with the work cylinder 1 and sealed. This connection can be made, for example, in the form of a soldered connection.

In FIG. 3, concentrically around the work cylinder 1, there is a tube 31, which forms the conduit 24 and the conduit 17. The conduits are separated from one another by means of gaskets 36. The shape of the passage 24, the circulation passage 17 and the grooves used to hold the gaskets can thereby be achieved by non-cutting shaping or forming.

In summing up, one aspect of the invention resides in a self-pumping hydropneumatic shock absorbing leg with internal level regulation, in particular for motor vehicles, with a work cylinder filled with a damping medium, under the pressure of at least one gas cushion located in a high-pressure chamber and acting as a spring. The work cylinder is divided by a work piston supported by a hollow piston rod into two work chambers, with a piston pump driven by the movements of the spring and which transports damping medium from a low pressure chamber into the work chamber connected to the high pressure chamber. The pump cylinder of the piston pump is formed by the hollow piston rod, into which extends a hollow pump rod fastened to the work cylinder and having a suction valve on its forward end. The hole in the pump rod is connected to the low pressure chamber and a deregulation opening which can be closed as a function of the position of the work piston in the work cylinder. The deregulation opening connects the work chamber, connected with the high pressure chamber, with a deregulation passage having a throttle, which empties into the low pressure chamber. The work piston 2 can be flowed through in one direction by the damping medium via at least one check valve 15. A passage 24 runs from one work chamber 18 to an adjustable damping valve 20. Starting from the damping valve 20, directly or indirectly, a flow connection 25 runs via at least one additional check valve 26 into the other work chamber 16. A circulation passage 17 forms a connection to the high pressure chamber 11.

Another aspect of the invention resides in that the base body 27 of the damping valve 20 holds the pump rod 19 in a hole 28 in a rigid or sealed manner.

Yet another aspect of the invention resides in that the additional check valve 26 is located in the base body 27 of the damping valve 20.

Still yet another aspect of the invention resides in that the passage 24 and/or the circulation passage 17 are located outside the work cylinder 1.

And still yet another aspect of the invention resides in that the passage 24 and/or the circulation passage 17 is formed by a tube 31, located concentrically around the work cylinder 1. The tube 31, by means of partitions, separates the passage 24 and/or the circulation passage 17 from one another, and from the low pressure chamber 10 and high pressure chamber 11 respectively.

A further aspect of the invention resides in that the low pressure chamber 10 and/or the high pressure chamber 11 are located outside the shock absorbing leg as a separate component.

The invention as described hereinabove in the context of preferred embodiments is not to be taken as limited to all of the provided details thereof, since modifications and variations thereof may be made without departing from the spirit and scope of the invention.

What is claimed is:

1. A self-pumping hydropneumatic shock absorber with leveling regulation for connection between relatively moveable first and second elements of a suspension of a vehicle, said shock absorber comprising:
   an elongated working cylinder having a first end and a second end;
   said second end of said working cylinder having a piston rod hole therethrough;
   a piston mounted on a piston rod;
   said piston being disposed for movement within said working cylinder with said piston rod extending through said piston rod hole in said second end;
   said first end of said working cylinder for being connected to said first element;
   said piston rod for being connected to said second element;
   said working cylinder including a supply of oil for damping movement of said piston within said working cylinder during relative movement of said first and said second elements;
   said piston being disposable within said working cylinder to define a first working chamber at said first end of said working cylinder and a second working chamber at said second end of said working cylinder;
   said piston being disposed for said movement in a first direction toward said first end of said working cylinder and in a second direction toward said second end of said working cylinder;
   said piston having at least one piston check valve means for controlling the supply of oil from said first working chamber to said second working chamber;
   said at least one piston check valve means for allowing said oil to flow in one direction from said first working chamber to said second working chamber;
   means for generating a self-pumping action to provide internal leveling regulation regardless of the direction of movement of said piston in response to relative movement between said first and second elements when connected to the suspension of a vehicle;
   first passage means for connecting said first working chamber and said second working chamber;
   adjustable valve means positioned in said first passage means for controlling the flow of oil between said first and second working chambers, said adjustable valve means movable to a preselected position in said first passage means to direct a flow of oil to said first working chamber for selected damping movement of said piston; and
   at least one check valve means positioned in said first passage means for allowing flow of at least some of said oil from said second working chamber through said first passage means into said first working chamber.

2. The shock absorber according to claim 1, further including means for providing a predetermined quantity of said oil to said working cylinder for generally locating said piston at a predetermined general position within said working cylinder during the relative movement of said first and said second elements.

3. The shock absorber according to claim 2, wherein:
   said means for providing said predetermined quantity of said oil includes chamber means, and
   said chamber means includes a pressurized oil chamber.

4. The shock absorber according to claim 3, further including second passage means for connecting said pressurized oil chamber and said first passage means.

5. The shock absorber according to claim 4, wherein:
   said second passage means is connected to said first passage means at a connection,
   said connection is located in said first passage means between said adjustable valve means and said at least one check valve means, and
   said at least one check valve means is for allowing flow of said oil from said second passage means and said pressurized oil chamber into said first working chamber.

6. The chock absorber according to claim 5, wherein said adjustable valve means is disposed within said first end of said working cylinder.

7. The shock absorber according to claim 6, wherein:
   said chamber means includes an oil supply chamber, and
   said means for providing said predetermined quantity of said oil includes said oil supply chamber.

8. The shock absorber according to claim 7, wherein said chamber means is disposed about said working cylinder.

9. The shock absorber according to claim 8, wherein:
said oil supply chamber is disposed toward said first end of said working cylinder, and
said pressurized oil chamber is disposed toward said second end of said working cylinder.

10. The shock absorber according to claim 9, wherein:
said at least one check valve means of said first passage means is disposed within said first end of said working cylinder, and
said connection is disposed within said first end of said working cylinder.

11. The shock absorber according to claim 10, wherein:
said first passage means includes a first major portion which is disposed outwardly of said working cylinder, and
said first major portion extends from said second working chamber to said first end of said working cylinder.

12. The shock absorber according to claim 11, wherein:
said second passage means includes a second major portion which is disposed outwardly of said working cylinder, and
said second major portion extends from said pressurized oil chamber to said first end of said working cylinder.

13. The shock absorber according to claim 1, wherein:
said first major portion and said second major portion are respectively defined by a first housing and a second housing,
said first housing is formed of at least a first exterior portion of said working cylinder and a first aligned portion of said chamber means,
said second housing is formed of at least a second exterior portion of said working cylinder and a second aligned portion of said chamber means,
said first aligned portion is aligned with said first exterior portion of said working cylinder, and
said second aligned portion is aligned with said second exterior portion of said working cylinder.

14. The shock absorber according to claim 13, wherein:
said first and said second aligned portions are formed of tubular means,
said tubular means surrounds said working cylinder,
said first major portion and said second major portion are circumferential separated one from the other by sealed contact between said tubular means and said working cylinder at contact regions, and
said contact regions are circumferentially between said first and said second exterior portions and between said first and said second aligned portions.

15. The shock absorber according to claim 13, wherein:
said means for providing said predetermined quantity of said oil includes piston pump means and supply passage means;
said supply passage means is operably connected to said oil supply chamber;
said supply passage means is disposed in said first end of said working cylinder,
said piston rod is hollow to define a pump cylinder;
said piston pump means includes said pump cylinder;
said piston pump means includes a hollow pump rod;
said hollow pump rod includes a first end and a second end;
said first end of said hollow pump rod is mounted to said first end of said working cylinder in communication with said supply passage means;
said second end of said hollow pump rod is disposed within said pump cylinder;
said second end of said hollow pump rod includes suction valve means; and
said movement of said piston in said second direction is for pumping oil by said piston pump means
from said oil supply chamber,
through said hollow pump rod, and
into said at least one of said first and said second working chambers.

16. The shock absorber according to claim 15, wherein:
said first end of said hollow pump rod is sealingly and rigidly mounted to said first end of said working cylinder, and
said pumping by said piston pump means is to said first working chamber.

17. The shock absorber according to claim 16, wherein:
said at least one check valve means of said first passage means is disposed within said first end of said working cylinder, and
said connection is disposed within said first end of said working cylinder.

18. The shock absorber according to claim 17, wherein:
said first passage means includes a first major portion which is disposed outwardly of said working cylinder,
said first major portion extends from said second working chamber to said first end of said working cylinder,
said second passage means includes a second major portion which is disposed outwardly of said working cylinder, and
said second major portion extends from said pressurized oil chamber to said first end of said working cylinder.

19. A self-pumping hydropneumatic shock absorber for connection between relatively moveable first and second elements of a suspension of a vehicle comprising:
an elongated working cylinder having a first end and a second end;
said second end of said working cylinder having a piston rod hole therethrough;
a piston rod extending through said piston rod hole;
a piston mounted on said piston rod;
said piston being disposed for movement within said working cylinder;
said first end of said working cylinder being connected to said first element;
said piston rod being connected to said second element;
said working cylinder including oil for damping movement of said piston within said working cylinder during relative movement of said first and said second elements;
said piston being disposable within said working cylinder to define a first working chamber at said first end of said working cylinder and a second working chamber at said second end of said working cylinder;

said piston being disposed for said movement in a first direction toward said first end of said working cylinder and in a second direction toward said second end of said working cylinder;

said piston having at least one piston check valve means;

said at least one piston check valve means for allowing said oil to flow therethrough from said first working chamber to said second working chamber;

first passage means for connecting said first working chamber and said second working chamber;

a pressurized oil chamber at least partially disposed about said working cylinder for supplying oil to said first working chamber;

means for connecting said pressurized oil chamber to said first passage means;

second passage means for connecting said pressurized oil chamber to said first working chamber;

valve means positioned in said first passage means for connecting said first passage means to said second passage means; and said valve means movable between a first position for interrupting flow of oil from said first passage means to said second passage means and a second position for allowing flow of oil from said first passage means to both said first working chamber and said pressurized oil chamber through said second passage means.

* * * * *

UNITED STATES PATENT AND TRADEMARK OFFICE
CERTIFICATE OF CORRECTION

PATENT NO. : 4,993,693

DATED : February 19, 1991

INVENTOR(S) : Karl-Heinz Löhr, et al.

It is certified that error appears in the above-identified patent and that said Letters Patent is hereby corrected as shown below:

Column 6:

In Claim 6, line 1, after 'The', delete "chock" and insert --shock--.

Column 7:

In Claim 13, line 1, after 'claim', delete "1" and insert --12--.

Column 8:

In Claim 17, line 1, after 'claim', delete "16" and insert --6--.

Signed and Sealed this

Eleventh Day of August, 1992

Attest:

DOUGLAS B. COMER

*Attesting Officer*   *Acting Commissioner of Patents and Trademarks*